United States Patent
Tsukamoto et al.

(10) Patent No.: US 9,606,763 B2
(45) Date of Patent: Mar. 28, 2017

(54) FOLDING ELECTRONIC DEVICE (71) Applicant: LENOVO (SINGAPORE) PTE. LTD., Singapore (SG)

(72) Inventors: Yasumichi Tsukamoto, Kanagawa-ken (JP); Moriyuki Tsuchihashi, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 14/562,562

(22) Filed: Dec. 5, 2014

(65) Prior Publication Data
US 2015/0160698 A1 Jun. 11, 2015

(30) Foreign Application Priority Data
Dec. 7, 2013 (JP) .................. 2013-253703

(51) Int. Cl.
G09G 5/00 (2006.01)
G06F 3/14 (2006.01)
G06F 1/16 (2006.01)

(52) U.S. Cl.
CPC .......... *G06F 3/1423* (2013.01); *G06F 1/1616* (2013.01); *G06F 1/1647* (2013.01); *G06F 1/1652* (2013.01)

(58) Field of Classification Search
CPC .... G06F 1/1616; G06F 1/1641; G06F 1/1647; G06F 3/1423
USPC ........................................... 345/1.3
See application file for complete search history.

(56) References Cited

U.S. PATENT DOCUMENTS

2012/0113614 A1* 5/2012 Watanabe ........... G02F 1/13336
361/810
2012/0206896 A1 8/2012 Suzuki et al.

FOREIGN PATENT DOCUMENTS

JP 2012-073293 4/2012
JP 2013-164498 8/2013

* cited by examiner

Primary Examiner — Gustavo Polo
(74) Attorney, Agent, or Firm — Russell Ng PLLC; Anthony P. Ng (57) ABSTRACT A folding electronic device is disclosed. The folding electronic device includes a first flexible display, a second flexible display, a hinge mechanism and an image data generation unit. The first flexible display, which includes a first pixel matrix disposed at a first primary flat part and at a first bending part, enables a user to observe light beams emitted from the first primary flat part and the first bending part that bends to define a first inner side face in a front view direction. The second flexible display, which includes a second pixel matrix disposed at a second primary flat part and a second bending part, enables said user to observe light beams emitted from the second primary flat part and the second bending part that bends to define a second inner side face in the front view direction. The first flexible display is connected to the second flexible display via the hinge mechanism. The image data generation unit generates image data on display regions of the first pixel matrix and the second pixel matrix.

7 Claims, 9 Drawing Sheets

FOLDING ELECTRONIC DEVICE

PRIORITY CLAIM

The present application claims benefit of priority under 35 U.S.C. §§120, 365 to the previously filed Japanese Patent Application No, JP2013-253703 with a priority date of Dec. 7, 2013, which is incorporated by reference herein.

BACKGROUND OF THE INVENTION

1. Technical Field

The present invention relates to folding electronic devices in general, and particularly to a method for enhancing the viewing range of an enlarged screen made up of multiple displays disposed adjacently to each other within a folding electronic device.

2. Description of Related Art

Some electronic devices such as a laptop personal computer (laptop PC), a tablet computer (tablet PC), a mobile phone or a multifunction mobile phone (smartphone) include two or more chassis that are coupled to be foldable via a hinge mechanism. Hereinafter such electronic devices are called folding electronic devices. Some folding electronic devices include each chassis with a flat panel display (FPD) mounted thereon as well as a touch panel enabling a touch input to the FPD. Such a folding electronic device can be folded to be convenient for carriage and storage when the folding electronic device is not being used, and when the chassis are opened for use, the multiple FPDs may be coupled together to form a large desktop screen.

SUMMARY OF THE INVENTION

In accordance with a preferred embodiment of the present invention, a folding electronic device includes a first flexible display, a second flexible display, a hinge mechanism and an image data generation unit. The first flexible display, which includes a first pixel matrix disposed at a first primary flat part and at a first bending part, enables a user to observe light beams emitted from the first primary flat part and the first bending part that bends to define a first inner side face in a front view direction. The second flexible display, which includes a second pixel matrix disposed at a second primary flat part and a second bending part, enables said user to observe light beams emitted from the second primary flat part and the second bending part that bends to define a second inner side face in the front view direction. The first flexible display is connected to the second flexible display via the hinge mechanism. The image data generation unit generates image data on display regions of the first pixel matrix and the second pixel matrix.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
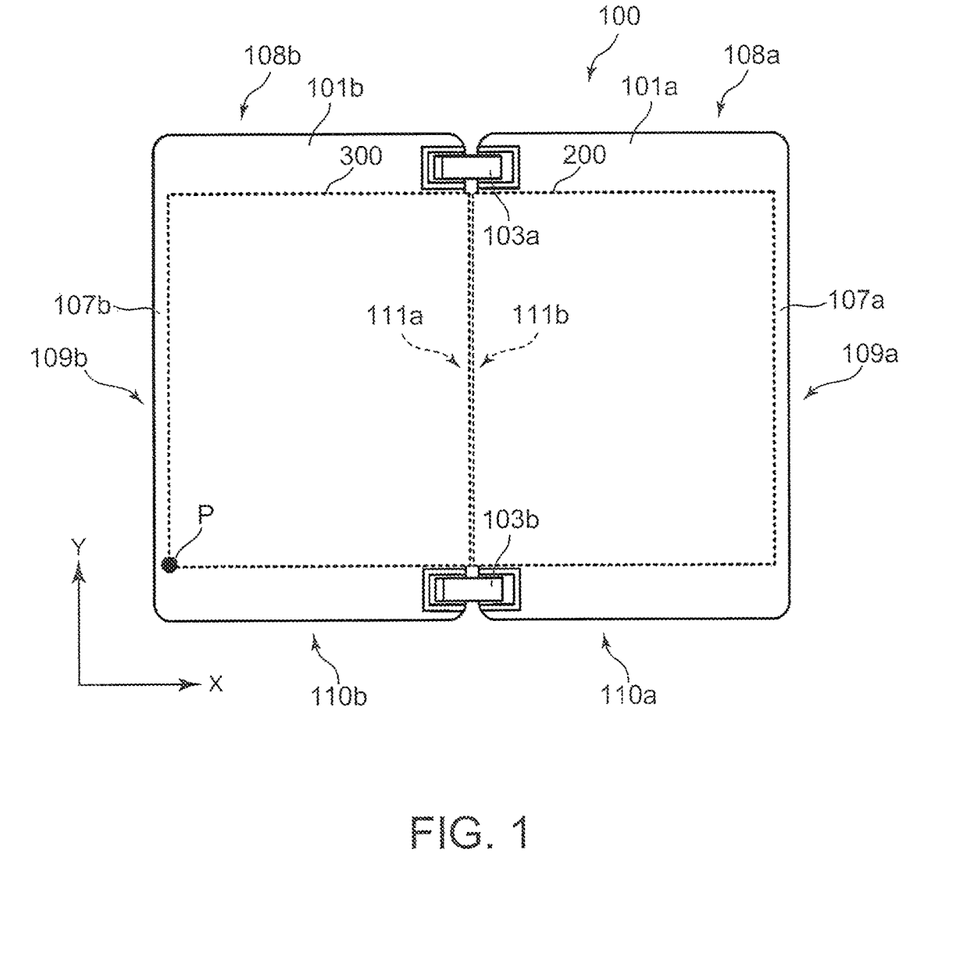
FIG. 1 is a plan view of a smartphone in which a preferred embodiment of the present invention is incorporated.
Figure 2A:
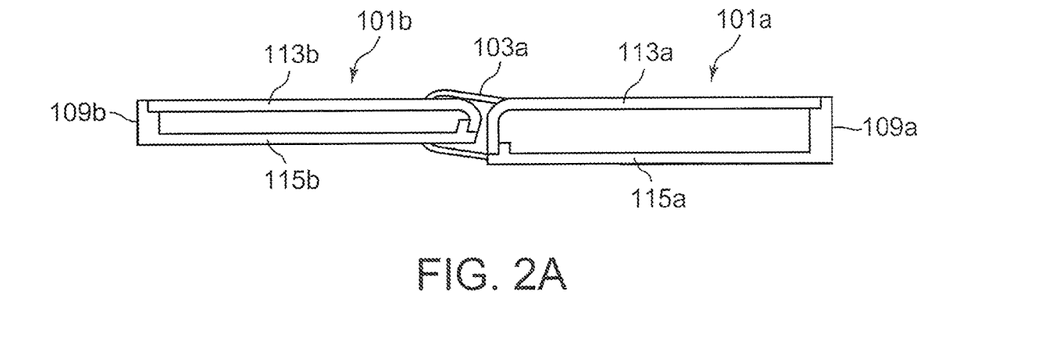
FIGS. 2A-2C are side views and a cross-sectional view of the smartphone from FIG. 1.
Figure 2B:
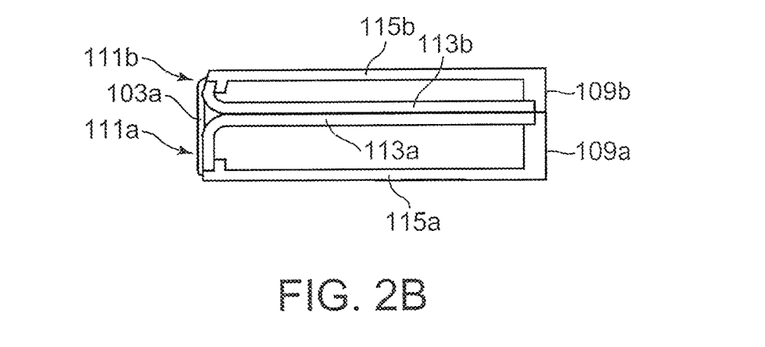
Figure 2C:
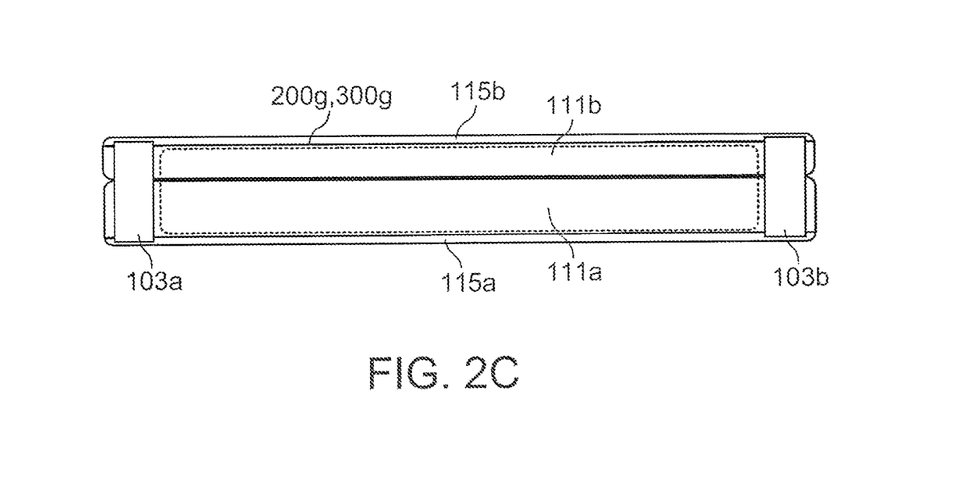
Figure 3:
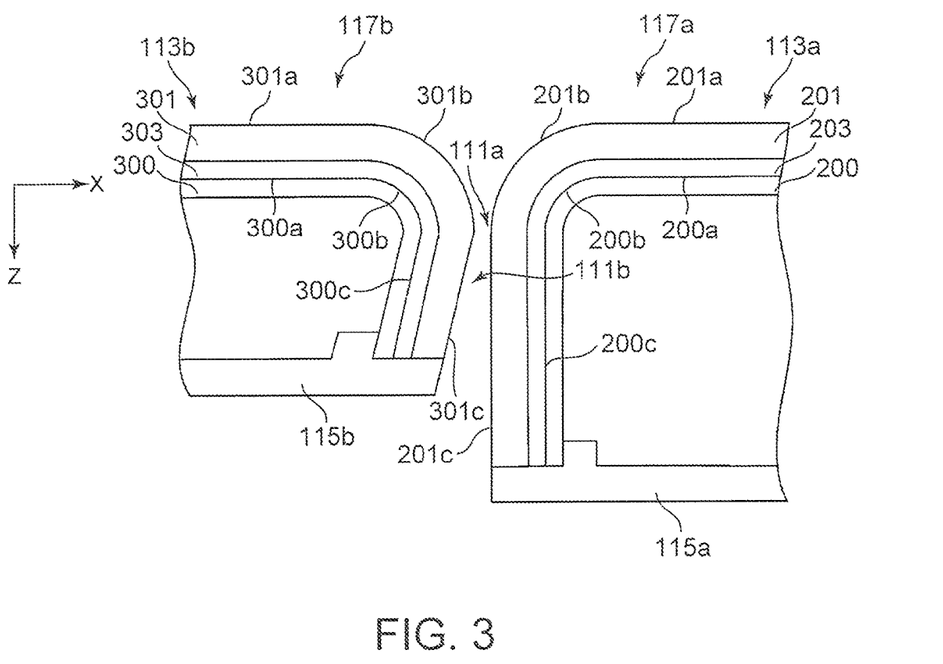
FIG. 3 is an enlarged cross-sectional view of the smartphone from FIG. 1 for illustrating a part close to inner side faces.
Figure 4:
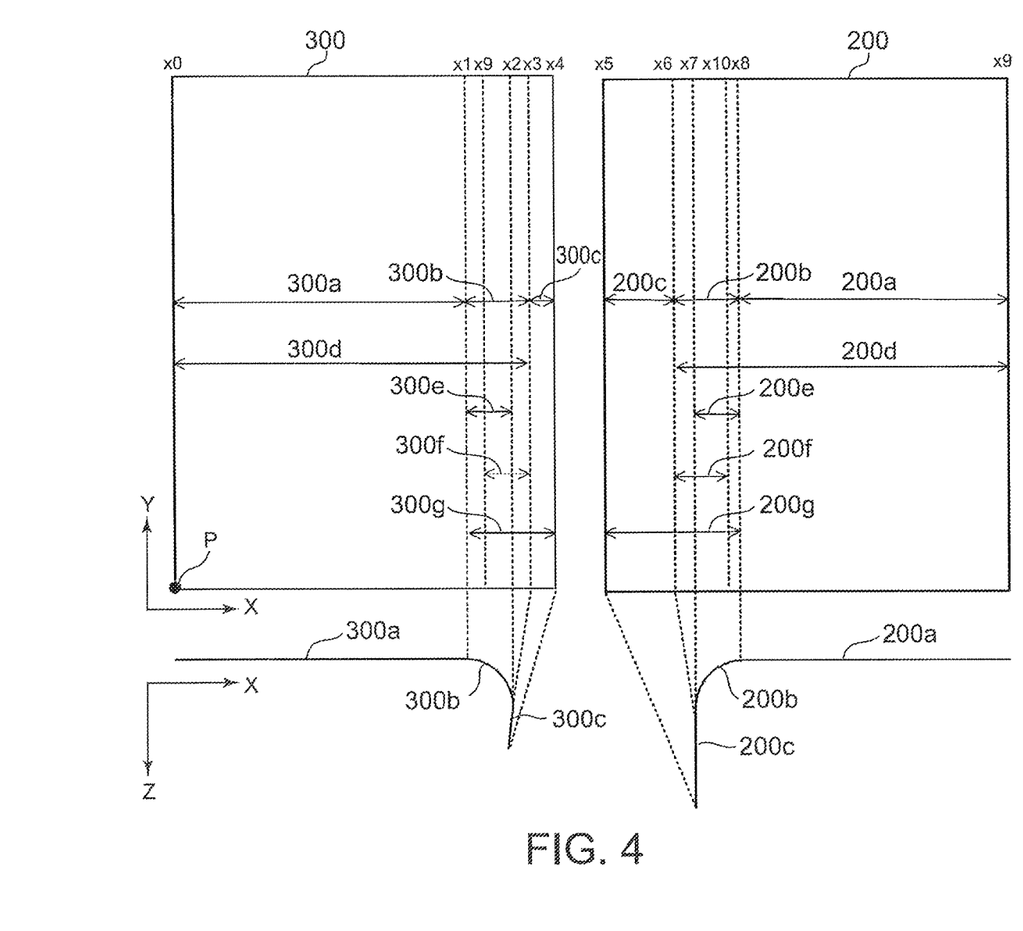
FIG. 4 describes a display region of flexible displays.

FIG. 1 is a plan view of a smartphone 100 as one example of a folding electronic device according to a preferred embodiment of the present invention. Other exemplary electronic devices, to which the present invention is applicable, include a notebook PC, a mobile phone and a tablet PC. The present invention is applicable not only to folding electronic devices but also to other display devices that configure a large desktop screen including a plurality of displays disposed. FIG. 2 includes a side view and cross-sectional views of the smartphone 100, and FIG. 3 is an enlarged cross-sectional view to illustrate a part close to inner side faces 111a and 111b of the smartphone 100. FIG. 4 describes a display region of flexible displays 200 and 300.

In FIG. 1, the smartphone 100 is configured so that units 101a and 101b are coupled via hinge mechanisms 103a and 103b to be operable/closable. FIG. 1 illustrates the state of the units 101a and 101b that are opened for use, and they can be folded for storage or carriage so that the flexible displays 200 and 300 are opposed (FIG. 2B). In the present specification, the state of FIGS. 1 (and 2A) is called an open state, and the state of FIG. 2B is called a close state.

X-Y coordinates are defined for the smartphone 100 while setting the position P at the lower left corner of the flexible display 300 as the origin. Z-axis is defined downward (FIG. 3). The units 101a and 101b include mutually independent chassis and electronic devices contained in their chassis. The units 101a and 101b have outer side faces 109a and 109b, inner side faces 111a and 111b, and upper side faces 108a and 108b and lower side faces 110a and 110b, respectively, each of which defines the outline of the outer shape partially. At spaces surrounded with the outer side faces 109a and 109b, the upper side faces 108a and 108b, the lower side faces 110a and 110b and three side edges of the flexible displays 200 and 300, peripheral frames 107a and 107b are disposed.

Figure 5:
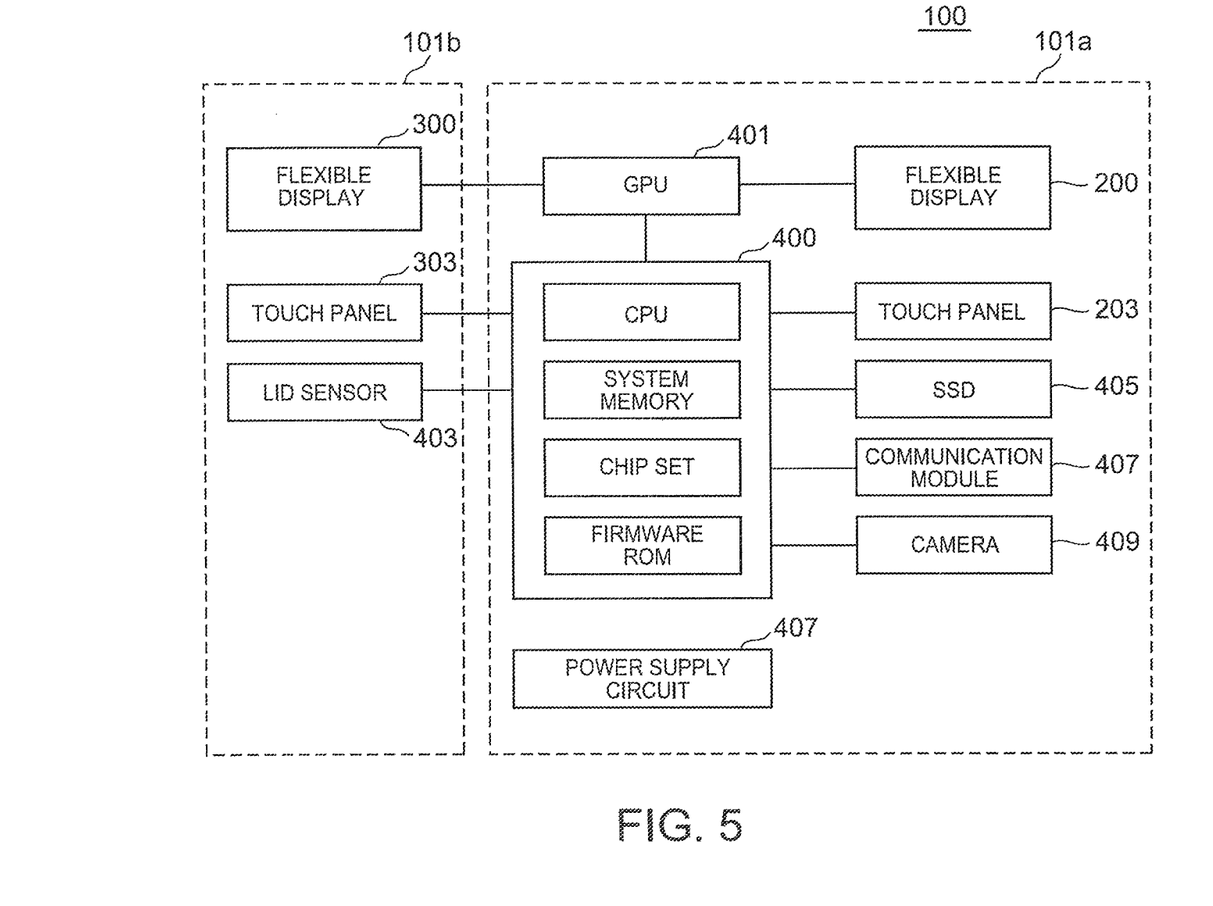
FIG. 5 is a block diagram of the smartphone from FIG. 1.

FIG. 2A is a cross-sectional view in the open state, FIG. 2B is a cross-sectional view in the close state and FIG. 2C is a side view to illustrate the inner side faces 111a and 111b in the close state. The outline of the units 101a and 101b is defined by surfaces of base plates 115a and 115b and laminates 113a and 113b, respectively. Although not illustrated in FIG. 2, spaces defined by the base, plates 115a and 115b and the laminates 113a and 113b are to accommodate electronic devices therein, such as a circuit board with a semiconductor and a circuit element mounted thereon, a battery unit, and a power supply circuit (FIG. 5).

The base plates 115a and 115b function as a structural body of the smartphone 100, which may be made of a metal material such as aluminum or magnesium or a synthetic resin. The hinge mechanisms 103a and 103b couple the base plates 115a and 115b so that the inner side faces 111a and 111b are opposed mutually in the open state, and the inner side faces 111a and 111b are disposed adjacently in the close state. FIG. 2C illustrates secondary display regions 200g and 300g (FIG. 4) of the flexible displays 200 and 300 that are provided at the inner side faces 111a and 111b. The secondary display regions 200g and 300g may be provided at any one of the inner side faces 111a and 111b only.

As illustrated in FIG. 3, the laminates 113a and 113b include the lamination of top plates 201 and 301, touch panels 203 and 303 and flexible displays 200 and 300, respectively, that are stacked in this order from the above. The top plates 201 and 301 and the base plates 115a and 115b function as the chassis of the smartphone 100. The top plates 201 and 301 may be made of a material having a high light transmission rate, such as an acrylic resin or glass. The top plates 201 and 301 include top-face flat parts 201a and 301a, bending parts 201b and 301b and side-face flat parts 201c and 301c, respectively.

The top-face flat parts 201a and 301a and the side-face flat parts 201c and 301c have outer surfaces that are in a flat face. The top-face flat parts 201a and 301a of the present embodiment are flat faces that are substantially parallel to the X-Y plane. The bending parts 201b and 301b are bent towards the direction of the base plates 115a and 115b (Z-axis direction). The top-face flat part 201a and a part of the bending part 201b make up a top face 117a of the flexible display 200, and the side-face flat part 201c and the other part of the bending part 201b make up the inner side face 111a of the flexible display 200.

The top-face flat part 301a and a part of the bending part 301b make up a top face 117b of the flexible display 300, and the side-face flat part 301c and the other part of the bending put 301b make up the inner side face 111b of the flexible display 300. The top faces 117a and 117b of the flexible displays 200 and 300 are disposed side-by-side in the open state, and the top faces 117a and 117b are opposed in the close state. The bending parts 201b and 301b can be shaped with the curvature to exert the photorefractive effect described later, thus minimizing distortion and display loss of an image.

The touch panels 203 and 303 that are flexible and are of a capacitance type made of a material having a high light transmission rate are attached on the inside of the top plates 201 and 301 so as to be along their surfaces. The touch panels 203 and 303 are configured to detect the position of a finger during a touch operation at the surfaces of the top plates 201 and 301 as coordinates of the flexible displays 200 and 300 for outputting. The principle of the detection of the touch panels 203 and 303 is not limited to a capacitance type, which may be a touch panel based on other detection principles such as a resistive film type or an optical type.

The flexible displays 200 and 300 are attached on the inside of the touch panels 203 and 303 so as to be along their surfaces. The flexible displays 200 and 300 are self-luminous display devices, and light-emitting elements thereof are not limited especially, including various light-emitting elements such as an organic EL element, an inorganic EL element, a field emission element, a plasma discharge element and an electrophoretic element. The following describes the case including the organic EL element as an example. The flexible displays 200 and 300 may be display devices categorized into electronic paper.

The flexible displays 200 and 300 may display an image in black and white or in color. In the case of color display, a light-emitting element emitting colored light may be used, or a light-emitting element emitting white light may be combined with a color filter. Although the flexible displays 200 and 300 may be driven by a passive matrix method, the following describes the case of an active matrix method as an example. The flexible displays 200 and 300 are stacked to be along the shapes of the top plates 201 and 301 and the touch panels 203 and 303, and so have the shapes defined in accordance with the shapes of them. The flexible displays 200 and 300 include primary flat parts 200a and 300a, bending parts 200b and 300b and secondary flat parts 200c and 300c.

Since the top plates 201 and 301 and the touch panels 203 and 303 are made of a transmissive material, both the primary flat part 200a and the bending part 200b make up the top face 117a of the flexible display 200 and both the secondary flat part 200c and the bending part 200b make up the inner side face 111a of the flexible display 200 because they are an observable region. Similarly, the primary flat part 300a and the bending part 300b make up the top face 117b of the flexible display 300 and the secondary flat part 300c and the bending part 300b make up the inner side face 111b of the flexible display 300. In the open state, the secondary flat parts 200c and 300c are opposed, and in the close state, the primary flat parts 200a and 300a are opposed.

FIG. 4 illustrates a side view of the flexible displays 200 and 300 that are assembled into the top plates 201 and 301 and a plan view when they are developed on a flat plane. When the flexible displays 200 and 300 are assembled into the top plates 201 and 301, the primary flat parts 200a and 300a and the secondary flat parts 200c and 300c keep the flat faces, and the bending parts 200b and 300b bend in the Z-axis direction along the X-axis direction. Since the bending of the flexible displays 200 and 300 in the Z-direction does not occur in the Y-axis direction, characteristic shapes of the flexible displays 200 and 300 that are assembled into the top plates 201 and 301 can be described in the X coordinates.

The regions defined with coordinates x8 to x9 and x0 to x1 correspond to the primary flat parts 200a and 300a, the regions defined with coordinates x6 to x8 and x1 to x3 correspond to the bending parts 200b and 300b, and the regions defined with coordinates x5 to x6 and x3 to x4 correspond to the secondary flat parts 200c and 300e. The direction where the observer observes the primary flat parts 200a and 300a from the front is called a primary front view direction, and the observation from the primary front view direction is called primary front viewing. The top faces 117a and 117b (FIG. 3) made up of the primary flat parts 200a and 300a and the bending parts 200b and 300b correspond to the region that can be observed by primary front viewing.

The lengths x7 to x8 and x1 to x2 of the bending parts 200b and 300b that are viewed in the primary front view direction when being assembled into the top plates 201 and 301 are shorter than the lengths 200b and 300b when being developed in the flat face, and the secondary flat parts 200c and 300c cannot be primary-front viewed. The lengths of the bending parts 200b and 300b in the primary front view direction that are defined with the lengths x7 to x8 and x1 to x2 are called effective display regions 200e and 300e. The regions including the primary flat parts 200a and 300a and the bending parts 200b and 300b are called primary display regions 200d and 300d.

As illustrated in FIG. 2C, the direction where the observer observes the inner side faces 111a and 111b in the close state from the front is called a secondary front view direction, and the observation from the secondary front view direction is called secondary front viewing. The inner side faces 111a and 111*b* made up of the secondary flat parts 201*c* and 301*c* and the bending parts 201*b* and 301*b* correspond to the regions that can be observed by secondary front viewing. Although FIG. 3 illustrates the side-face flat part 301*c* and the secondary flat part 300*c* that are slightly inclined for the design purpose, the secondary front view direction for the secondary flat part 200*c* in the close state can be regarded as the secondary front view direction for the secondary flat part 300*c* because the inclination angle is small. The top plates 201 and 301 of course may be configured so that the side-face flat part 301*c* and the secondary flat part 300*c* and the side-face flat part 201*c* and the secondary flat part 200*c* become parallel in the open state.

The lengths x6 to x10 and x9 to x3 of the bending parts 200*b* and 300*b* that are viewed in the secondary front view direction when being assembled into the top plates 201 and 301 are shorter than the lengths 200*b* and 300*b* when being developed in the flat face. The lengths of the bending parts 200*b* and 300*b* in the secondary front view direction that are defined with the lengths x6 to x10 and x9 to x3 are called effective display regions 200*f* and 300*f*. The regions including the secondary flat parts 200*e* and 300*c* and the bending parts 200*b* and 300*b* are called secondary display regions 200*g* and 300*g*. Since the secondary display regions 200*g* and 300*g* display relatively small image data, any one of them only can be used. The bending parts 200*b* and 300*b* may not be used. The flexible displays 200 and 300 have four sides blocked with the sealing agent.

FIG. 5 is a block diagram of the smartphone 100. In one example, the unit 101*a*, includes a system 400, a power supply circuit 407 and a GPU 401, a flexible display 200, a touch panel 203, a SSD 405, a communication module 407, a camera 409 and the like connected to the system 400. The unit 101*b* includes a flexible display 300, a touch panel 303 and a lid sensor 403 that are connected to the system 400. Types of the devices included in the units 101*a* and 101*b* are not limited to the example of FIG. 5, and the unit 101*b* may include a camera. 409, for example. The smartphone 100 includes many other devices which are not necessary to understand the present invention, and so their or descriptions are omitted.

The SSD 405 stores software such as an operating system, an application program and a device driver. The communication module 407 performs a wireless communication such as Wi-Fi, telephone, near field communication (NFC) or GPS. The lid sensor 403 detects any one of the close state or other states of the units 101*a* and 101*b* and notifies the system 400 of the state. The system 400 is configured by cooperation of hardware such as a CPU, a system memory, a chip set and a firmware ROM and software stored in the SSD 405 that the CPU executes. The devices included in the unit 101 and the devices included in the unit 101*b* are wired via the hinge mechanisms 103*a* and 103*b*.

Figure 6:
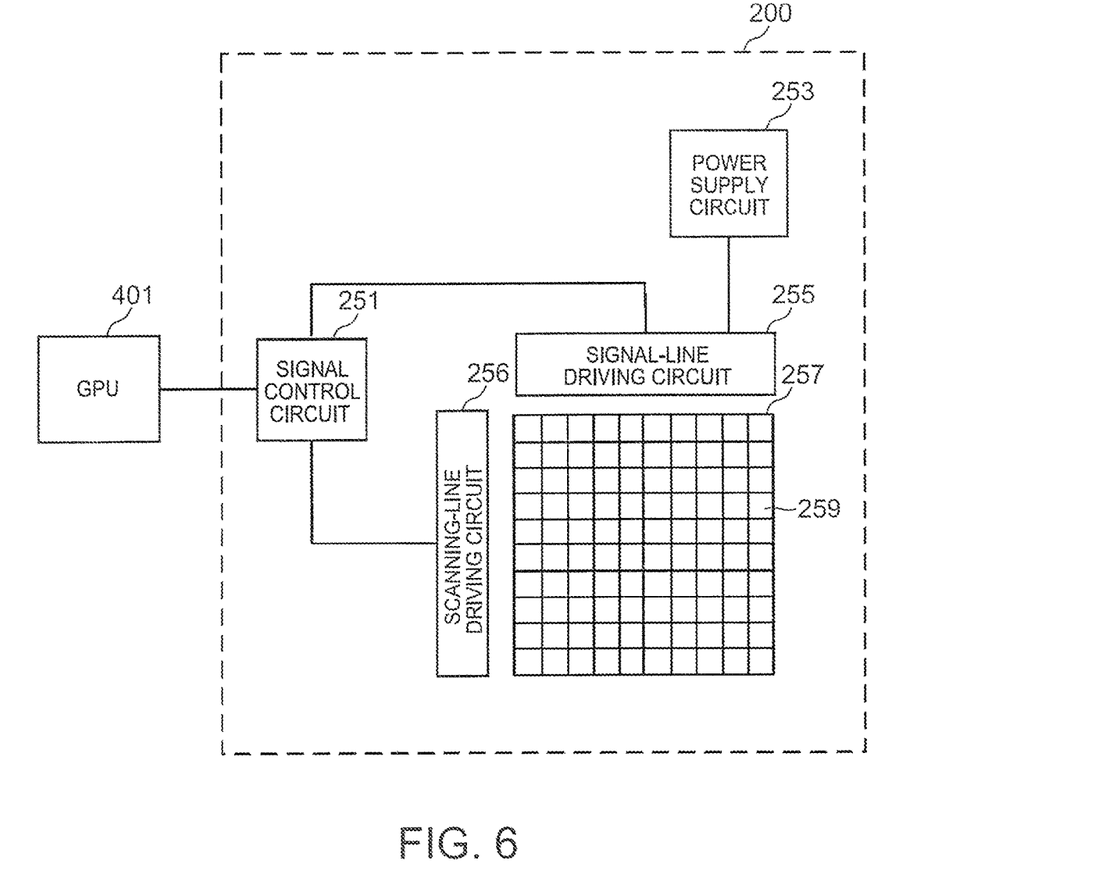
FIG. 6 is a block diagram describing the schematic configuration of the flexible display.

FIG. 6 is a block diagram describing the schematic configuration of the flexible display 200. The flexible display 300 can be configured similarly. A pixel matrix 257 is made up of a plurality of pixels 259 that are arranged in a matrix form. The pixel matrix 257 is disposed at the overall regions of the flexible displays 200 and 300 indicated with x0 to x4 and x5 to x9 (FIG. 4).

A sealing agent is provided around the pixel matrix 257. Each pixel 259 is connected to a signal-line driving circuit 255 via a data line and a current supply line, and is connected to a scanning-line driving circuit 256 via a scanning line. Each pixel 259 includes an organic EL element serving as an emission layer, a switch element (TFT) that selects a pixel and controls current supplied to the organic EL element, a capacitor that stores image data, and the like.

A signal control circuit 251 receives a RGB data signal, a synchronization signal, and a clock signal from the GPU 401 to generate a control signal to drive the signal-line driving circuit 255 and the scanning-line driving circuit 256, and sends the RGB data signal to the signal-line driving circuit 255 at a predetermined timing. A power supply circuit 253 supplies power to the circuits included in the flexible display 200, and supplies current to let the organic EL elements emit light to the signal-line driving circuit 255. The signal control circuit 251, the signal-line driving circuit 255, the scanning-line driving circuit 256, the power supply circuit 253 and the like are disposed below the peripheral frames 107*a* and 107*b* illustrated in FIG. 1.

Figure 7:
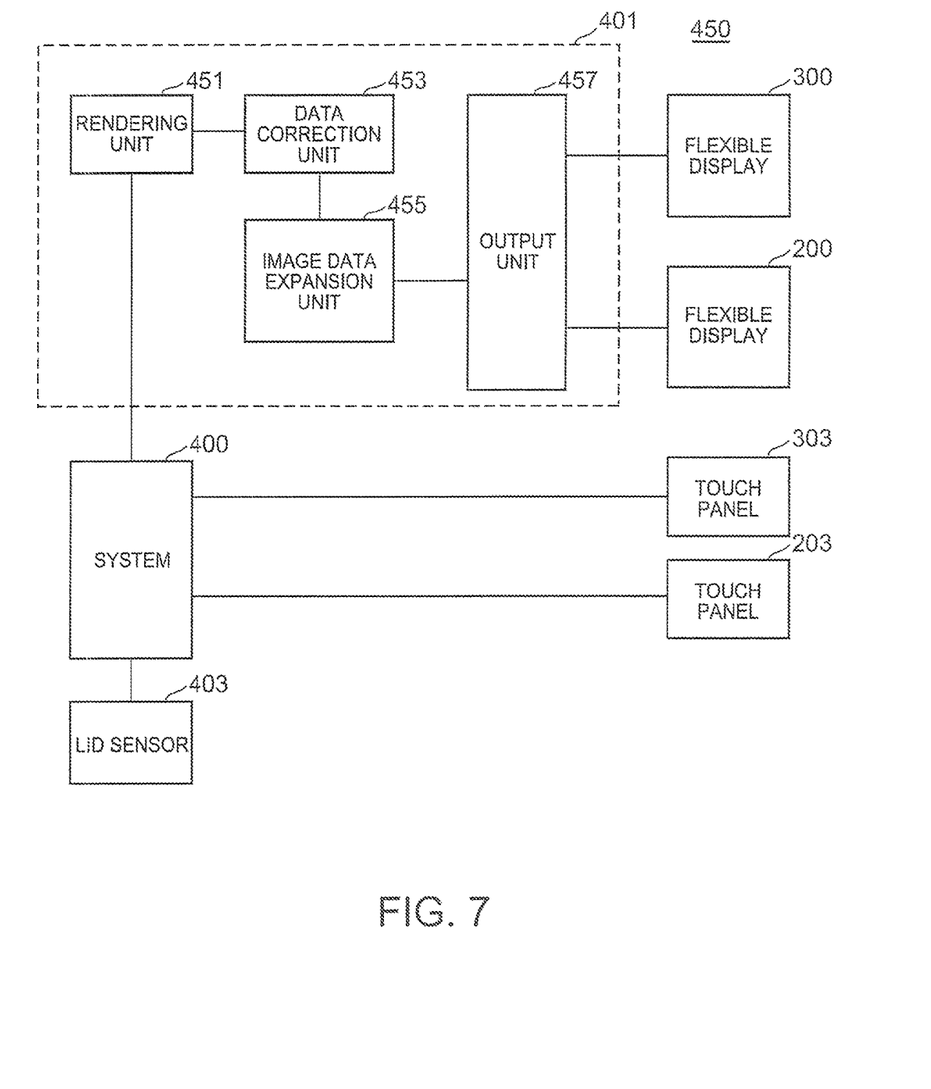
FIG. 7 is a block diagram describing an display system implemented within the smartphone from FIG. 1.

FIG. 7 is a block diagram describing a display system 450 implemented in the smartphone 100. The GPU 401 executes the device driver stored in the SSD 405 to configure a rendering unit 451, a data correction unit 453, an image data expansion unit 455 and an output unit 457. The rendering, unit 451 processes a rendering command received from the system 400, and creates image data directly corresponding to an image to be displayed at the flexible displays 200 and 300.

The rendering unit 451 receives, from the system 400, a command indicating among which of the primary display regions 200*d* and 300*d* and the secondary display regions 200*g* and 300*g* an image is to be displayed. Displaying at the primary display regions 200*d* and 300*d* is called primary screen display, and displaying at the secondary display regions 200*g* and 300*g* is called secondary screen display. For the primary screen display, the rendering unit 451 recognizes the size of the flexible display 200 as the total number of pixels of the primary flat part 200*a* and the effective display region 200*e* and recognizes the size of the flexible display 300 as the total number of pixels of the primary flat part 300*a* and the effective display region 300*e*, and creates, image data, suitable for them.

For the secondary screen display, the rendering unit 451 recognizes the size of the flexible display 200 as the total number of pixels of the secondary flat part 200*c* and the effective display region 200*f* and recognizes the size of the flexible display 300 as the total number of pixels of the secondary flat part 300*c* and the effective display region 300*f*, and creates image data suitable for them. When receiving a command for primary screen display in the setting of the display method in the expanded mode, the rendering unit 451 recognizes the overall region including the combination of the primary display region 200*d* and the primary display region 300*d* as one desktop screen.

At this time, the rendering unit 451 creates image data to display one image across the primary display regions 200*d* and 300*d*. In the case of the primary front viewing, an image displayed at the pixel matrix 257 of the bending parts 200*b* and 300*b* contributes only in the range of the effective display regions 200*e* and 300*e*. Then when the rendering unit 451 recognizes the size of the flexible displays 200 and 300 as the size of the primary display regions 200*d* and 300*d* to create image data, then the image of the bending parts 200*b* and 300*b* observed in the primary front view direction is reduced in size in the X-axis direction compared with the image of the primary flat parts 200*a* and 300*a*. In order to correct such distortion of the image, the data correction unit 453 of the present embodiment corrects image data of the effective display regions 200*e* and 300*e* received from the rendering unit 451 so that the image observed from the primary front view direction is brought close to the image displayed at the primary flat parts 200a and 300a.

The data correction unit 453 corrects the image data of the effective display regions 200e and 300e of the image data received from the rendering unit 451 to be image data of the number of pixels of the bending parts 200b and 300b. The data correction unit 453 inserts pixels for correction at a predetermined position in the X-axis direction into the image data of the effective display regions 200e and 300e. The pixels for correction can be a linear pixel pattern that is long in the Y-axis direction having the same image data set as the image data of pixels adjacent to them in the X-axis direction at the insertion position. The pixels of the bending parts 200b and 300b observed by the primary front viewing decreases in area in the X-axis direction with increasing proximity to the secondary flat parts 200c and 300c. As the area of the pixels decreases, the data correction unit 453 increases the number of lines of the stripe-shaped pixel pattern for correction to be inserted with increasing proximity of the pixels from the primary flat parts 200a and 300a to the secondary flat parts 200c and 300c.

Similarly, in the case of the secondary front viewing, an image displayed at the pixel matrix 257 of the bending parts 200b and 300b contributes only in the range of the effective display regions 200f and 300f. Then when image data to be displayed at the bending parts 200b and 300b is created, the image actually observed is reduced in size compared with the image displayed at the secondary flat parts 200c and 300c. The data correction unit 453 corrects image data received from the rendering unit 451 so that the image observed from the secondary front view direction is brought close to the image at the secondary flat parts 200c and 300c. Such correction can be performed based on the principle similar to the primary front viewing as stated above so as to increase the number of lines of pixel pattern for correction with increasing proximity of the pixels to the primary flat parts 200a and 300a.

The image data expansion unit 455 expands the image data created by the data correction unit 453 into an image to be displayed at the flexible displays 200 and 300. The image data expansion unit 455 can expand image data corresponding to the number of pixels of the flexible displays 200 and 300 as a whole. The image data expansion unit 455 expands image data that is corrected for the primary display regions 200d and 300d IQ corresponding to the primary flat parts 200a and 300a and the bending parts 200b and 300b in the case of the primary screen display, and expands image data that is corrected for the secondary display regions 200g and 300g corresponding to the secondary flat parts 200c and 300c and the bending parts 200b and 300b in the case of the secondary screen display.

The output unit 457 transfers the image data expanded by the image data expansion unit 455 to the flexible displays 200 and 300 at a predetermined timing. For the primary screen display, the output unit 457 transfers the image data of the primary display region 200d that is expanded at the image data expansion unit 455 to the flexible display 200, and transfers the image data of the primary display region 300d to the flexible display 300. For the secondary screen display, the output unit 457 transfers the image data of the secondary display region 200g that is expanded at the image data expansion unit 455 to the flexible display 200, and transfers the image data of the secondary display region 300g to the flexible display 300.

For the primary screen display, the output unit 457 does not output image data corresponding, to the pixels at the secondary flat parts 200c and 300c, and for the secondary screen display, the output unit does not output image data corresponding to the pixels at the primary flat parts 200a and 300a, whereby power consumption can be saved. The system 400 can control so that the touch panels 203 and 303 operate only at the regions corresponding to the output range of image data.

Figure 8:
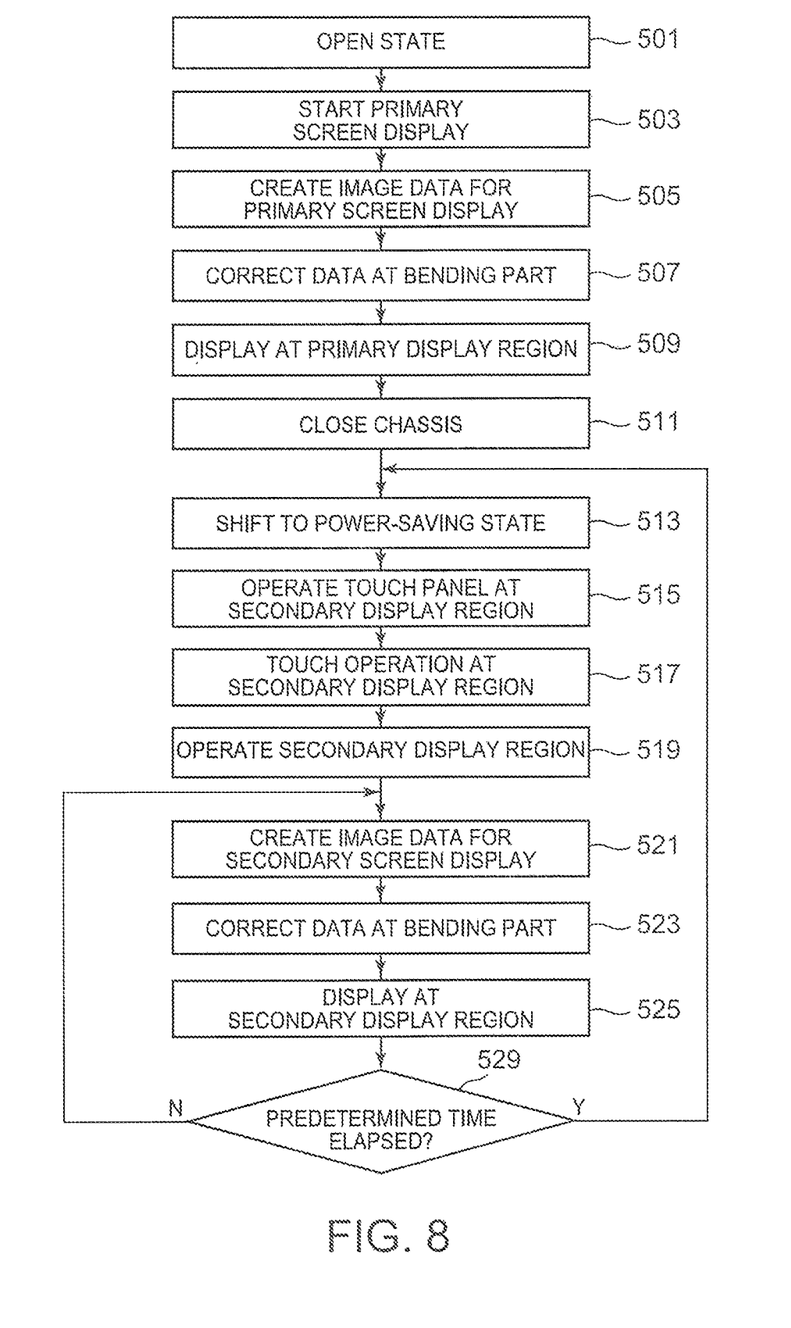
FIG. 8 is a flowchart of a method used by the display system to display an image.

FIG. 8 is a flowchart of a method used by the display system 450 to display an image. At block 501, when the smartphone 100 in the power-Save state is opened, the lid sensor 403 acts and so the power supply circuit 407 supplies power to each device for shifting to the power-on state. Let that the GPU 401 is set in the expanded mode. At block 503, receiving the event from the lid sensor 403, the system 400 sends a command for primary screen display to the CPU 401.

At block 505, the rendering unit 451 creates image data corresponding to the number of pixels for the primary screen display, and at block 507 the data correction unit 453 corrects the image data at the bending parts 200b and 300b and sends the same to the image data expansion unit 455. At block 509, an image is displayed while using the primary display regions 200d and 300d of the flexible displays 200 and 300 as one desktop screen.

Figure 10:
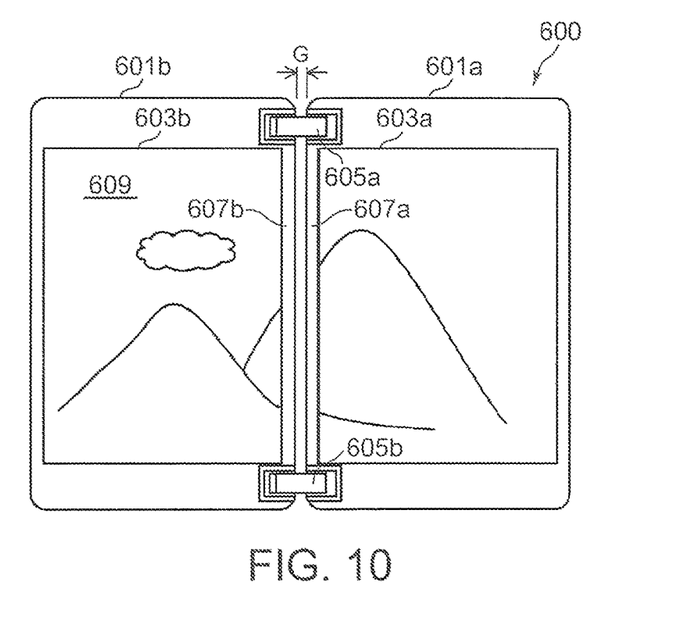
FIG. 10 is a plan view of a conventional smartphone.

At a position where the flexible displays 200 and 300 are adjacent to each other, image data corrected at the bending parts 200b and 300b also contributes to an image for the primary front viewing. That is, the range of display loss of the image can be reduced close to the physical gap G as compared with the case of FIG. 10. Further since the image data to be displayed at the bending parts 200b and 300b are corrected, an image displayed can have a quality that is close to the image that the primary flat parts 200a and 300a display.

At block 511, when the smartphone shifts to the close state, the lid sensor 403 acts to notify the system 400 of the event. At block 513, the system 400 instructs the power supply circuit 407 to make the smartphone 100 transition to the power-saving state. In the power-saving state, the flexible displays 200 and 300 stop the operation. At block 515, the system 400 supplies power only to the region of the touch panels corresponding to the secondary display regions 200g and 300g for power saving, while enables the detection of a touch operation at the secondary display regions 200g and 300g.

During the power-saving state, the system 400 wakes regularly to operate the communication module 407 so as to check the arrival of new mail. When new mail arrives, such information is written in a non-volatile memory or a volatile memory, to which power enabling storage is supplied during the power-saving state as well. At block 517, when the user performs a touch operation at the secondary display regions 200g and 300g, the touch panels 203 and 303 notify the system 400 of the touch event.

Receiving the touch event, at block 519 the system 400 instructs the power supply circuit 407 to supply power to minimum devices that are necessary to display an in image at the secondary display regions 200g and 300g only. At block 521, the system 400 sends a command, to the GPU 401, to display image data indicating the reception of mail that is stored in the non-volatile memory at the secondary display regions 200g and 300g. The system 400 may send a command, to the GPU 401, to display an image at any one of the secondary display regions 200g and 300g only.

At block 521, the rendering unit 451 creates image data corresponding to the number of pixels for secondary screen display, and at block 523 the data correction unit 453 corrects the image data at the bending parts 200b and 300b and sends the same to the image data expansion unit 455. At block 525, an image is displayed by using the secondary display regions 200g and 300g of the flexible displays 200 and 300 as one desktop screen. At a position where the secondary display regions 200g and 300g are adjacent to each other, image data corrected at the bending parts 200b and 300b also contributes to an image for the secondary front viewing, and so the range of display loss of the image can be reduced, and a decrease in the display quality can be prevented.

The secondary display regions 200g and 300g in the close state can display various types of information such as a radio-wave reception state, the current time, weather forecast, and a battery charge state. Although the secondary display regions 200g and 300g have small display areas, they are a part of the flexible displays 200 and 300, and so these regions can display information created by the system 400 in the close state, unlike an indicator that displays the state of devices independent of the system 400.

Figure 9:
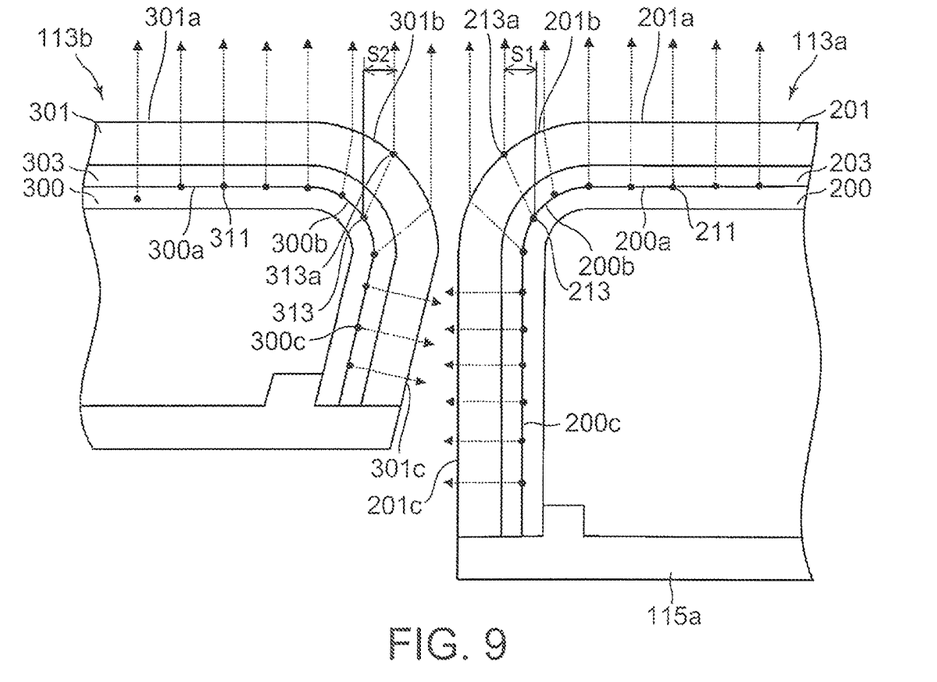
FIG. 9 describes the photorefractive effect of top plates.

FIG. 9 describes the photorefractive effect of the top plates 201 and 301 at the bending parts 201b and 301b. As illustrated in FIG. 9, the thickness of the top plates 201 and 301 increases display loss because it increases the gap between the bending parts 200b and 300b of the flexible displays 200 and 300. The top plates 201 and 301 made of glass or transparent acrylic resin have a refractive index of about 1.5, whereas the refractive index of air is 1. That is, light emitted from the light-emitting elements has a critical angle of about 42 degrees when the light is emitted from the top plates 201 and 301 to the air.

Light beams emitted from pixels 211 and 311 that are arranged at constant intervals in the X-axis direction at the primary flat parts 200a and 300a are emitted as parallel light beams in the primary front viewing direction when the light beams pass through the top-face flat parts 201a and 301a of the top plates 201 and 301. Adjustment of the curvature of the bending parts 201b and 301b allows light beams emitted from pixels 213 and 313 that are arranged at constant intervals at the bending parts 200b and 300b to be refracted due to the photorefractive effect when they pass through positions 213a and 313a of the top cover and to be emitted as parallel light beams in the primary front viewing direction.

The observer recognizes the positions 213a and 313a as the light-emission positions of the pixels 213 and 313, and so recognizes that the pixels of the bending parts 200b and 300b are located at positions closer to the mutual displays by distances S1 and S2. Adjustment of the curvature of the bending parts 201b and 301b can decrease the area of display loss as well as the distortion of an image by primary front viewing. Such a photorefractive effect can be used instead of the data correction by the data correction, unit 453 or in combination with the data correction.

The above describes the present invention by way of the example of a display including two units that are coupled via a hinge structure. The present invention is applicable to a display including three or more units as well, which are coupled via a hinge structure. In that case, the control circuit of the flexible displays can be placed at a position of the bottom face when the display is bent at their side faces by 180 degrees. The present invention is applicable not only to a hinge-coupled display but also to one large display made up of a plurality of displays disposed adjacently.

As has been described, the present disclosure provides a method for improving the viewing range of an enlarged screen made up of multiple displays disposed adjacently to each other within a folding electronic device.

While the disclosure has been particularly shown and described with reference to a preferred embodiment, it will be understood by those skilled in the art that various changes in form and detail may be made therein without departing from the spirit and scope of the disclosure.

What is claimed is:

1. A folding electronic device comprising:
a first panel having a first flexible display that includes a first top plate and a first pixel matrix, wherein said first flexible display includes a first primary flat part and a first bending part, wherein said first pixel matrix includes a plurality of light-emitting elements located at equal distance from each other, wherein a curvature of said first bending part of said first flexible display is configured to be adjusted to allow light beams emitted from said light-emitting elements located at said first bending part to be in a direction parallel to light beams emitted from said light-emitting elements located at said first flat part;
a second panel having a second flexible display that includes a second top plate and a second pixel matrix, wherein said second flexible display includes a second primary flat part and a second bending part, wherein said second pixel matrix includes a plurality of light-emitting elements located at equal distance from each other, wherein a curvature of said second bending part of said second flexible display is configured to be adjusted to allow light beams emitted from said light-emitting elements located at said second bending part to be a direction parallel to light beams emitted from said light-emitting elements located at said second flat part;
a hinge mechanism for connecting said first panel to said second panel; and
an image data generation unit within at least one of said first and second panels to generate image data on display regions of said first pixel matrix and said second pixel matrix.

2. The folding electronic device of claim 1, wherein said light beams emitted from said light-emitting elements located at said first bending part is in a direction parallel to light beams emitted from said light-emitting elements located at said first flat part after passing through said first top plate.

3. The folding electronic device of claim 1, wherein said light beams emitted from said light-emitting elements located at said second bending part is in a direction parallel to light beams emitted from said light-emitting elements located at said second flat part after passing through said second top plate.

4. The folding electronic device of claim 1, wherein said first top plate is made of glass having a refractive index of approximately 1.5.

5. The folding electronic device of claim 4, wherein said second top plate is made of glass having a refractive index of approximately 1.5.

6. The folding electronic device of claim 1, wherein said first top plate is made of transparent acrylic resin having a refractive index of approximately 1.5.

7. The folding electronic device of claim 6, wherein said second top plate is made of transparent acrylic resin having a refractive index of approximately 1.5.

* * * * *